United States Patent Office 3,284,461
Patented Nov. 8, 1966

3,284,461
O-PYRIDYLALKYL-N-ALKENYL URETHANES AND PROCESS FOR THEIR PRODUCTION
Godfrey Wilbert, Carmel, and Seymour Hyden, Spring Valley, N.Y., assignors to Nepera Chemical Co., Inc.
No Drawing. Filed Nov. 27, 1964, Ser. No. 414,466
3 Claims. (Cl. 260—295)

This invention relates to a composition of matter and relates more particularly to compounds of the formula:

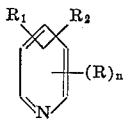

wherein R represents

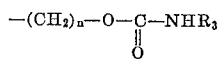

or

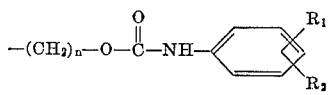

in which $R_3$ represents lower alkenyl such as allyl and vinyl and $R_1$ and $R_2$ each represent hydrogen, lower alkyl of 1 to 6 carbon atoms, such as methyl, ethyl, propyl, isopropyl and the like, halogen, nitro, thioalkyl, heterocyclic such as pyridyl, pyrimidyl, furyl and imidazoyl, aryl such as phenyl or substituted aryl such as phenethyl and $n$ is from 1 to 2.

The compounds of this invention are useful as comonomers in polymerization. They are also useful as agricultural chemicals such as weed killers, fungus inhibitors and plant growth regulators.

According to this invention, these compounds are prepared by reacting hydroxypyridines of the formula:

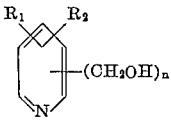

with isocyanate compounds of the formula:

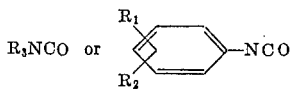

in which R is as defined.

This reaction is effected at a temperature of 5° C. to 10° C. in a solvent system preferably consisting of pyridine or ethyl ether, for example. The desired reaction product may be recovered from the reaction mixture by dilution with ice water followed by extraction with an immiscible solvent such as ethyl ether. The crude product may be separated and purified using fractional distillation or crystallization techniques.

In order to further illustrate the practice of this invention, the following examples are given:

*Example 1.—O-3-pyridylmethyl-N-allylcarbamate*

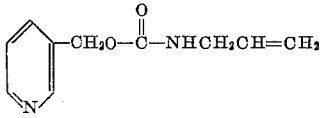

10.9 g. of pyridine-3-carbinol are suspended in 40 ml. ether and cooled to 5° C. 8.3 g. of allyl isocyanate are added over ½ hour, dropwise, with stirring at a temperature of 5° to 10° C. The homogenous reaction mixture is allowed to warm to room temperature (20° to 30° C.) stirred one hour, washed with 50 ml. of cold water and the ethereal layer dried. The ether is removed by distillation and the product obtained by distillation at 151–154° C./1–2 mm., $n_D^{21}$=1.5276. The infra-red spectrum features a band at 1705 cm.$^{-1}$.

Percent N calcd.: 14.58. Found: 14.81.

*Example 2.—O-2-(β-pyridylethyl)-N-allylcarbamate*

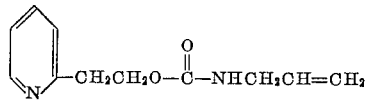

12.3 g. of pyridine-2-ethanol are dissolved in 40 ml. pyridine and cooled to 5° C. 8.3 g. of allyl isocyanate are added, dropwise, with stirring at a temperature of 5° C. to 10° C. The reaction mixture is allowed to warm to room temperature (20 to 30° C.), stirred one hour and added to 250 ml. of ice water and the aqueous mixture is extracted with ether. The ethereal layer is dried; the ether removed by distillation and the product obtained by distillation at 150–155° C./2–3 mm. The distillate solidifies upon standing to have M.P.=54.5–56.5° C. The infra-red spectrum features a band at 1695 cm.$^{-1}$ (C=O).

*Example 3.—O-3-pyridylmethyl-N-phenylcarbamate*

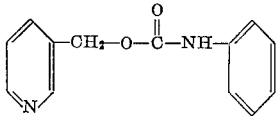

10.9 g. of pyridine-3-carbinol are dissolved in 40 ml. of pyridine and cooled to 5° C. 11.9 g. of phenyl isocyanate are added, dropwise, with stirring at a temperature of 5° to 10° C. The reaction mixture is allowed to warm to room temperature (20° to 30° C.), stirred one hour and added to 200 ml. of ice water to afford a solid product. The carbamate, after recrystallization from benzene-hexane has M.P.=134–136° C. The infra-red spectrum features a band at 1710 cm.$^{-1}$ (C=O).

It is to be understood that the foregoing detailed description is given merely by way of illustration and that many variations may be made therein without departing from the spirit of our invention.

Having described our invention, what we desire to secure by Letters Patent is:

1. A compound of the formula

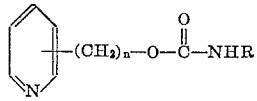

wherein R is lower alkenyl and $n$ is 1 or 2.
2. O-3-pyridylmethyl-N-allylcarbamate.
3. O-2-(β-pyridylethyl)-N-allylcarbamate.

References Cited by the Examiner

Kametani et al.: Chem. Pharm. Bull., Tokyo, volume 6, pages 467–472 (1958). Abstracted from C.A., volume 53 (1959), par. 10215.

Profft et al.: Arch. Pharm., Germany, volume 296, pages 209–212 (1963). Abstracted from C.A., volume 59 (1963), par. 635h.

WALTER A. MODANCE, *Primary Examiner.*

ALAN L. ROTMAN, *Assistant Examiner.*